US011883333B2

(12) United States Patent
Childs et al.

(10) Patent No.: US 11,883,333 B2
(45) **Date of Patent: *Jan. 30, 2024**

(54) PATIENT TRANSPORT APPARATUS WITH CONTROLLABLE AUXILIARY WHEEL ASSEMBLY

(71) Applicant: Stryker Corporation, Kalamazoo, MI (US)

(72) Inventors: William D. Childs, Plainwell, MI (US); Kevin M. Patmore, Plainwell, MI (US); Marco Constant, Portage, MI (US); Brian Tessmer, Mattawan, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,106

(22) Filed: Jun. 21, 2022

(65) Prior Publication Data

US 2022/0313508 A1 Oct. 6, 2022

Related U.S. Application Data

(63) Continuation of application No. 16/870,096, filed on May 8, 2020, now Pat. No. 11,395,777, which is a (Continued)

(51) Int. Cl.

| | |
|---|---|
| ***A61G 7/012*** | (2006.01) |
| ***A61G 1/02*** | (2006.01) |
| ***A61G 7/05*** | (2006.01) |

(52) U.S. Cl.

CPC ......... *A61G 1/0268* (2013.01); *A61G 1/0237* (2013.01); *A61G 1/0275* (2013.01);

(Continued)

(58) Field of Classification Search

CPC ........ A61G 1/0268; A61G 5/006; A61G 7/08; A61G 7/00; A61G 6/04; A61G 7/012;

(Continued)

(56) References Cited

U.S. PATENT DOCUMENTS 4,015,735 A * 4/1977 Berglund ................ B60P 1/027 414/420

4,056,158 A * 11/1977 Ross ........................ B60G 5/04 180/24.02

(Continued)

FOREIGN PATENT DOCUMENTS

AU 764314 B2 8/2003
CA 2798910 A1 11/2011

(Continued)

OTHER PUBLICATIONS

English language abstract and machine-assisted translation for DE19949351 extracted from espacenet.com on Sep. 14, 2017; 13 pages.

(Continued)

*Primary Examiner* — Yuri Kan

(74) *Attorney, Agent, or Firm* — Howard & Howard Attorneys PLLC

(57) ABSTRACT

A patient transport apparatus for transporting a patient over a surface. The patient transport apparatus has support wheels coupled to a base and swivelable about swivel axes. An auxiliary wheel assembly is coupled to the base and includes an auxiliary wheel configured to move between a plurality of wheel positions, and an actuator operably coupled to the auxiliary wheel to move the auxiliary wheel between the plurality of wheel positions. A sensing system with a sensor is provided to detect a motion condition of the patient transport apparatus. A controller is coupled to the sensing system and to the actuator, and is configured to drive the actuator to move the auxiliary wheel between the plurality of (Continued)

wheel positions based on the motion condition of the patient transport apparatus.

20 Claims, 6 Drawing Sheets

Related U.S. Application Data continuation of application No. 16/007,591, filed on Jun. 13, 2018, now Pat. No. 10,682,269, which is a continuation of application No. 15/386,593, filed on Dec. 21, 2016, now Pat. No. 10,045,893.

(60) Provisional application No. 62/270,704, filed on Dec. 22, 2015.

(52) U.S. Cl.
CPC ......... *A61G 7/0506* (2013.01); *A61G 7/0507* (2013.01); *A61G 7/0516* (2016.11); *A61G 2203/12* (2013.01); *A61G 2203/16* (2013.01); *A61G 2203/32* (2013.01); *A61G 2203/36* (2013.01); *A61G 2203/40* (2013.01); *A61G 2203/44* (2013.01)

(58) Field of Classification Search
CPC .... A61G 7/1017; A61G 1/0275; B62D 57/04; B60G 5/04; B60K 23/0808; B60P 1/027
See application file for complete search history.

(56) References Cited

U.S. PATENT DOCUMENTS

| | | | | |
|---|---|---|---|---|
| 5,279,010 | A * | 1/1994 | Ferrand | A61G 7/00 5/507.1 |
| 5,806,111 | A | 9/1998 | Heimbrock et al. | |
| 5,927,423 | A | 7/1999 | Wada et al. | |
| 6,256,812 | B1 | 7/2001 | Bartow et al. | |
| 6,330,926 | B1 | 12/2001 | Heimbrock et al. | |
| 6,752,224 | B2 | 6/2004 | Hopper et al. | |
| 6,786,083 | B1 | 9/2004 | Bain et al. | |
| 6,792,630 | B1 * | 9/2004 | Palmatier | A61G 7/012 280/43.17 |
| 6,834,402 | B2 | 12/2004 | Hanson et al. | |
| 7,191,854 | B2 | 3/2007 | Lenkman | |
| 7,481,286 | B2 | 1/2009 | Ruschke et al. | |
| 8,196,944 | B1 | 6/2012 | Vondrak | |
| 8,397,846 | B2 | 3/2013 | Heimbrock et al. | |
| 8,442,738 | B2 | 5/2013 | Patmore | |
| 8,720,616 | B2 | 5/2014 | Kofoed et al. | |
| 8,746,710 | B2 | 6/2014 | Schejbal | |
| 8,984,685 | B2 | 3/2015 | Robertson et al. | |
| 9,271,887 | B2 | 3/2016 | Schejbal | |
| 10,045,893 | B2 * | 8/2018 | Childs | A61G 1/0237 |
| 10,682,269 | B2 * | 6/2020 | Childs | A61G 7/0506 |
| 11,395,777 | B2 * | 7/2022 | Childs | A61G 1/0275 |
| 2003/0009825 | A1 | 1/2003 | Gallant et al. | |
| 2003/0159861 | A1 * | 8/2003 | Hopper | A61G 7/08 180/22 |
| 2003/0184071 | A1 * | 10/2003 | Tokumaru | B62D 57/04 280/758 |
| 2004/0200646 | A1 * | 10/2004 | Waters | A61G 7/08 180/15 |
| 2005/0236208 | A1 | 10/2005 | Runkles et al. | |
| 2006/0133580 | A1 * | 6/2006 | Vezina | A61B 6/04 378/177 |
| 2007/0016559 | A1 | 1/2007 | Kraft | |
| 2008/0084175 | A1 | 4/2008 | Hollis | |
| 2008/0141459 | A1 | 6/2008 | Hamberg et al. | |
| 2011/0087416 | A1 | 4/2011 | Patmore | |
| 2011/0277241 | A1 | 11/2011 | Schejbal | |
| 2012/0280464 | A1 * | 11/2012 | Nelson | A61G 7/1017 280/86.75 |
| 2013/0304341 | A1 * | 11/2013 | Sakaguchi | B60K 23/0808 701/69 |
| 2014/0076644 | A1 | 3/2014 | Derenne et al. | |
| 2014/0150806 | A1 | 6/2014 | Hu et al. | |
| 2014/0230149 | A1 | 8/2014 | Schejbal | |
| 2015/0014959 | A1 * | 1/2015 | Youngmann | A61G 5/006 280/400 |
| 2016/0136018 | A1 | 5/2016 | DeLuca et al. | |
| 2016/0137216 | A1 * | 5/2016 | Nilsson | A61G 7/08 180/19.1 |
| 2016/0367415 | A1 | 12/2016 | Hayes et al. | |
| 2017/0020755 | A1 | 1/2017 | Paul | |
| 2020/0261287 | A1 | 8/2020 | Childs et al. | |

FOREIGN PATENT DOCUMENTS

| | | | |
|---|---|---|---|
| DE | 19949351 | A1 | 7/2001 |
| EP | 2208487 | A2 | 7/2010 |
| JP | 2000016298 | A | 1/2000 |
| WO | 2005041837 | A2 | 5/2005 |
| WO | 2006059200 | A2 | 6/2006 |
| WO | 2006059200 | A3 | 6/2006 |
| WO | 2006059200 | B1 | 1/2007 |
| WO | 2007016559 | A2 | 2/2007 |
| WO | 2009113009 | A1 | 9/2009 |
| WO | 2012055407 | A1 | 5/2012 |

OTHER PUBLICATIONS

English language abstract and machine-assisted translation for JP2000016298 extracted from espacenet.com on Sep. 14, 2017; 7 pages.

* cited by examiner

PATIENT TRANSPORT APPARATUS WITH CONTROLLABLE AUXILIARY WHEEL ASSEMBLY

RELATED APPLICATIONS

This application is a Continuation of U.S. patent application Ser. No. 16/870,096, filed on May 8, 2020, which is a Continuation of U.S. patent application Ser. No. 16/007,591, filed on Jun. 13, 2018 and issued as U.S. Pat. No. 10,682,269 on Jun. 16, 2020, which is a Continuation of U.S. patent application Ser. No. 15/386,593 filed on Dec. 21, 2016 and issued as U.S. Pat. No. 10,045,893 on Aug. 14, 2018, which claims priority to and the benefit of U.S. Provisional Patent Application No. 62/270,704, filed on Dec. 22, 2015, the entire contents and disclosures of each of which are hereby incorporated by reference.

BACKGROUND

Patient transport systems facilitate care of patients in a health care setting. Patient transport systems comprise patient transport apparatuses such as, for example, hospital beds and stretchers, to move patients between locations. A conventional patient transport apparatus comprises a base, a patient support surface, and several support wheels, such as four swiveling caster wheels. Often, the patient transport apparatus has one or more non-swiveling auxiliary wheels, in addition to the four caster wheels. The auxiliary wheels, by virtue of their non-swiveling nature, are employed to help control movement of the patient transport apparatus over a floor surface in certain situations.

When a caregiver wishes to use the auxiliary wheels to help control movement of the patient transport apparatus, such as down long hallways or around corners, the caregiver moves the auxiliary wheels from a stowed position, out of contact with the floor surface, to a deployed position in contact with the floor surface. However, if a normal force acting on the auxiliary wheels is too high (e.g., a load carried by the auxiliary wheels is too high), one pair of the caster wheels may lift off the ground and the patient transport apparatus may teeter-totter on the auxiliary wheels. Alternatively, if the normal force is too low (e.g., the load carried by the auxiliary wheels is too low), the auxiliary wheels may slip on the floor surface when the patient transport apparatus is being moved, such as when maneuvering around a corner.

A patient transport apparatus designed to overcome one or more of the aforementioned challenges is desired.

DETAILED DESCRIPTION

Figure 1:
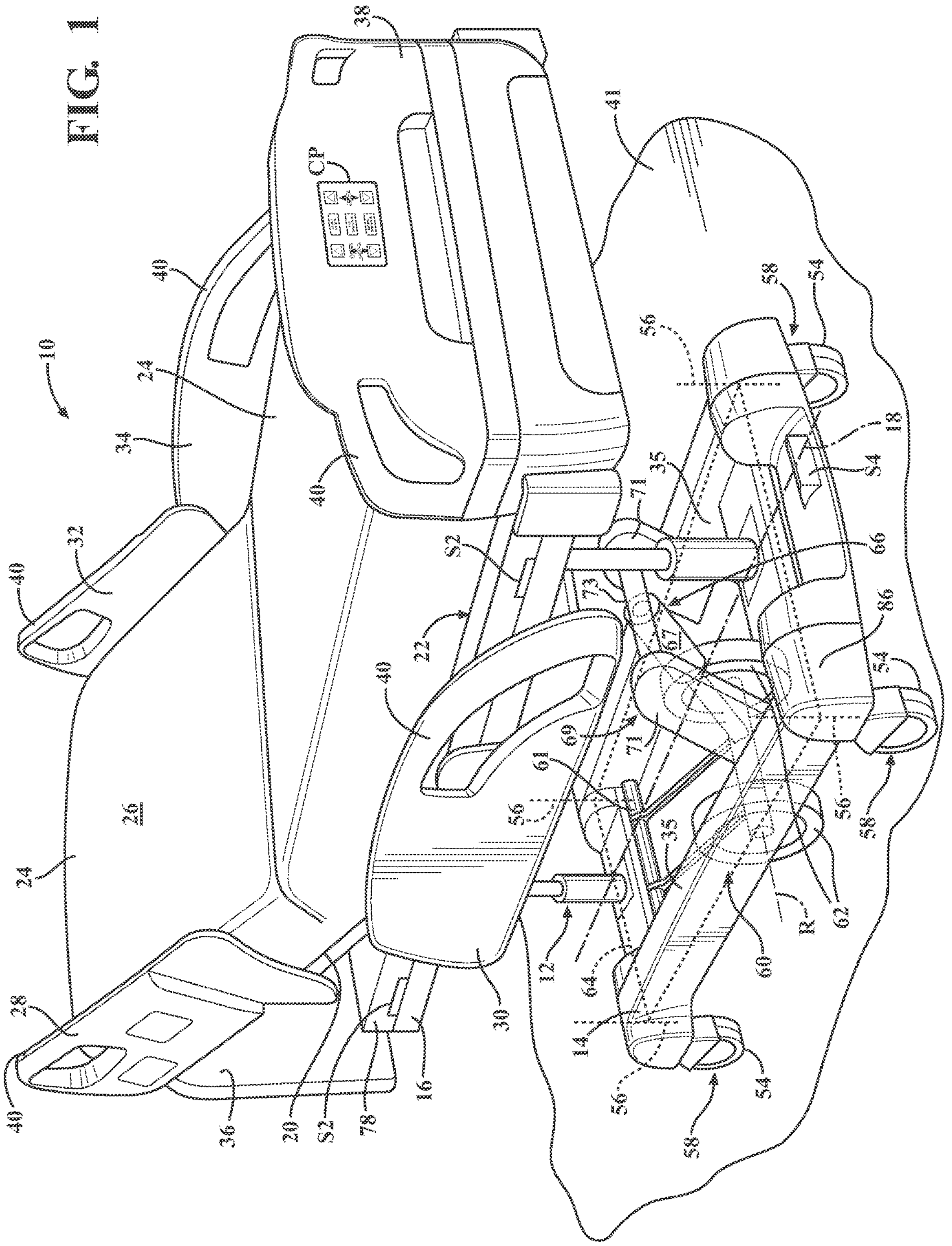
FIG. 1 is perspective view of a patient transport apparatus.

Referring to FIG. 1, a patient transport system comprising a patient transport apparatus 10 is shown for supporting a patient in a health care setting. The patient transport apparatus 10 illustrated in FIG. 1 comprises a hospital bed. In other embodiments, however, the patient transport apparatus 10 may comprise a stretcher, or similar apparatus, utilized in the care of a patient to transport the patient between locations.

A support structure 12 provides support for the patient. The support structure 12 illustrated in FIG. 1 comprises a base 14 and an intermediate frame 16. The base 14 defines a longitudinal axis 18 from a head end to a foot end. The intermediate frame 16 is spaced above the base 14. The support structure 12 also comprises a patient support deck 20 disposed on the intermediate frame 16. The patient support deck 20 comprises several sections, some of which articulate (e.g., pivot) relative to the intermediate frame 16, such as a fowler section, a seat section, a thigh section, and a foot section. The patient support deck 20 provides a patient support surface 22 upon which the patient is supported.

A mattress 24 is disposed on the patient support deck 20. The mattress 24 comprises a secondary patient support surface 26 upon which the patient is supported. The base 14, intermediate frame 16, patient support deck 20, and patient support surfaces 22, 26 each have a head end and a foot end corresponding to designated placement of the patient's head and feet on the patient transport apparatus 10. The construction of the support structure 12 may take on any known or conventional design, and is not limited to that specifically set forth above. In addition, the mattress 24 may be omitted in certain embodiments, such that the patient rests directly on the patient support surface 22.

Side rails 28, 30, 32, 34 are supported by the base 14. A first side rail 28 is positioned at a right head end of the intermediate frame 16. A second side rail 30 is positioned at a right foot end of the intermediate frame 16. A third side rail 32 is positioned at a left head end of the intermediate frame 16. A fourth side rail 34 is positioned at a left foot end of the intermediate frame 16. If the patient transport apparatus 10 is a stretcher, there may be fewer side rails. The side rails 28, 30, 32, 34 are movable between a raised position in which they block ingress and egress into and out of the patient transport apparatus 10 and a lowered position in which they are not an obstacle to such ingress and egress. The side rails 28, 30, 32, 34 may also be movable to one or more intermediate positions between the raised position and the lowered position. In still other configurations, the patient transport apparatus 10 may not include any side rails.

A headboard 36 and a footboard 38 are coupled to the intermediate frame 16. In other embodiments, when the headboard 36 and footboard 38 are included, the headboard 36 and footboard 38 may be coupled to other locations on the patient transport apparatus 10, such as the base 14. In still other embodiments, the patient transport apparatus 10 does not include the headboard 36 and/or the footboard 38.

Caregiver interfaces 40, such as handles, are shown integrated into the footboard 38 and side rails 28, 30, 32, 34 to facilitate movement of the patient transport apparatus 10 over floor surfaces 41. Additional caregiver interfaces 40 may be integrated into the headboard 36 and/or other components of the patient transport apparatus 10. The caregiver interfaces 40 are graspable by the caregiver to manipulate the patient transport apparatus 10 for movement.

Other forms of the caregiver interface 40 are also contemplated. The caregiver interface may comprise one or more handles coupled to the intermediate frame 16. The caregiver interface may simply be a surface on the patient transport apparatus 10 upon which the caregiver logically applies force to cause movement of the patient transport apparatus 10 in one or more directions, also referred to as a push location. This may comprise one or more surfaces on the intermediate frame 16 or base 14 This could also comprise one or more surfaces on or adjacent to the headboard 36, footboard 38, and/or side rails 28, 30, 32, 34. In other embodiments, the caregiver interface may comprise separate handles for each hand of the caregiver. For example, the caregiver interface may comprise two handles.

Support wheels 54 are coupled to the base 14 to support the base 14 on a floor surface such as a hospital floor. The support wheels 54 allow the patient transport apparatus 10 to move in any direction along the floor surface 41 by swiveling to assume a trailing orientation relative to a desired direction of movement. In the embodiment shown, the support wheels 54 comprise four support wheels each arranged in corners of the base 14. The support wheels 54 shown are caster wheels able to rotate and swivel about swivel axes 56 during transport. Each of the support wheels 54 forms part of a caster assembly 58. Each caster assembly 58 is mounted to the base 14. It should be understood that various configurations of the caster assemblies 58 are contemplated. In addition, in some embodiments, the support wheels 54 are not caster wheels and may be non-steerable, steerable, non-powered, powered, or combinations thereof. Additional support wheels 54 are also contemplated.

An auxiliary wheel assembly 60 is coupled to the base 14. The auxiliary wheel assembly 60 influences motion of the patient transport apparatus 10 during transportation over the floor surface 41. The auxiliary wheel assembly 60 comprises a pair of auxiliary wheels 62 and an actuator 66 operably coupled to the auxiliary wheels 62. The actuator 66 is operable to move the auxiliary wheels 62 between various deployed positions in contact with the floor surface 41 and a stowed position spaced away and out of contact with the floor surface 41.

By deploying the auxiliary wheels 62 on the floor surface 41, the patient transport apparatus 10 can be easily moved down long, straight hallways or around corners, owing to a non-swiveling nature of the auxiliary wheels 62. When the auxiliary wheels 62 are stowed, the patient transport apparatus 10 is subject to moving in an undesired direction due to uncontrollable swiveling of the support wheels 54. For instance, during movement down long, straight hallways, the patient transport apparatus 10 may be susceptible to "dog tracking," which refers to undesirable sideways movement of the patient transport apparatus 10. Additionally, when cornering, without the auxiliary wheels 62 deployed, and with all of the support wheels 54 able to swivel, there is no wheel assisting with steering through the corner.

The auxiliary wheels 62 may be arranged parallel to each other and the longitudinal axis 18 of the base 14. Said differently, the auxiliary wheels 62 rotate about a rotational axis R oriented perpendicularly to the longitudinal axis 18 of the base 14 (albeit offset in some cases from the longitudinal axis 18). In the embodiment shown, the auxiliary wheels 62 are incapable of swiveling about a swivel axis and are also referred to as steer wheels. In other embodiments, the auxiliary wheels 62 may be capable of swiveling, but can be locked in a steer lock position in which they are locked to solely rotate about the rotational axis R oriented perpendicularly to the longitudinal axis 18. In still other embodiments, the auxiliary wheels 62 may be able to freely swivel without any steer lock functionality. In embodiments in which the auxiliary wheels 62 are able to swivel, they may swivel about their own, separate swivel axes, or a common swivel axis of the auxiliary wheel assembly 60. The auxiliary wheel assembly 60 may comprise one, two, or more auxiliary wheels 62.

The auxiliary wheels 62 may be located to be deployed inside a perimeter of the base 14 and/or within a support wheel perimeter 64 defined by the swivel axes 56 of the support wheels 54. In some embodiments, such as those employing a single auxiliary wheel 62, the auxiliary wheel 62 may be located near a center of the support wheel perimeter 64, or offset from the center. In this case, the auxiliary wheel 62 may also be referred to as a fifth wheel. The auxiliary wheels 62 may be longitudinally and equally offset from the center of the support wheel perimeter 64. The auxiliary wheels 62 may also be equally and oppositely offset from the longitudinal axis 18 to be symmetrically positioned with respect to the longitudinal axis 18. In other embodiments, the auxiliary wheels 62 may be disposed along the support wheel perimeter 64 or outside of the support wheel perimeter 64. In the embodiment shown, each of the auxiliary wheels 62 has a diameter larger than a diameter of the support wheels 54. In other embodiments, the auxiliary wheels 62 may have the same or a smaller diameter than the support wheels 54.

Figure 2:
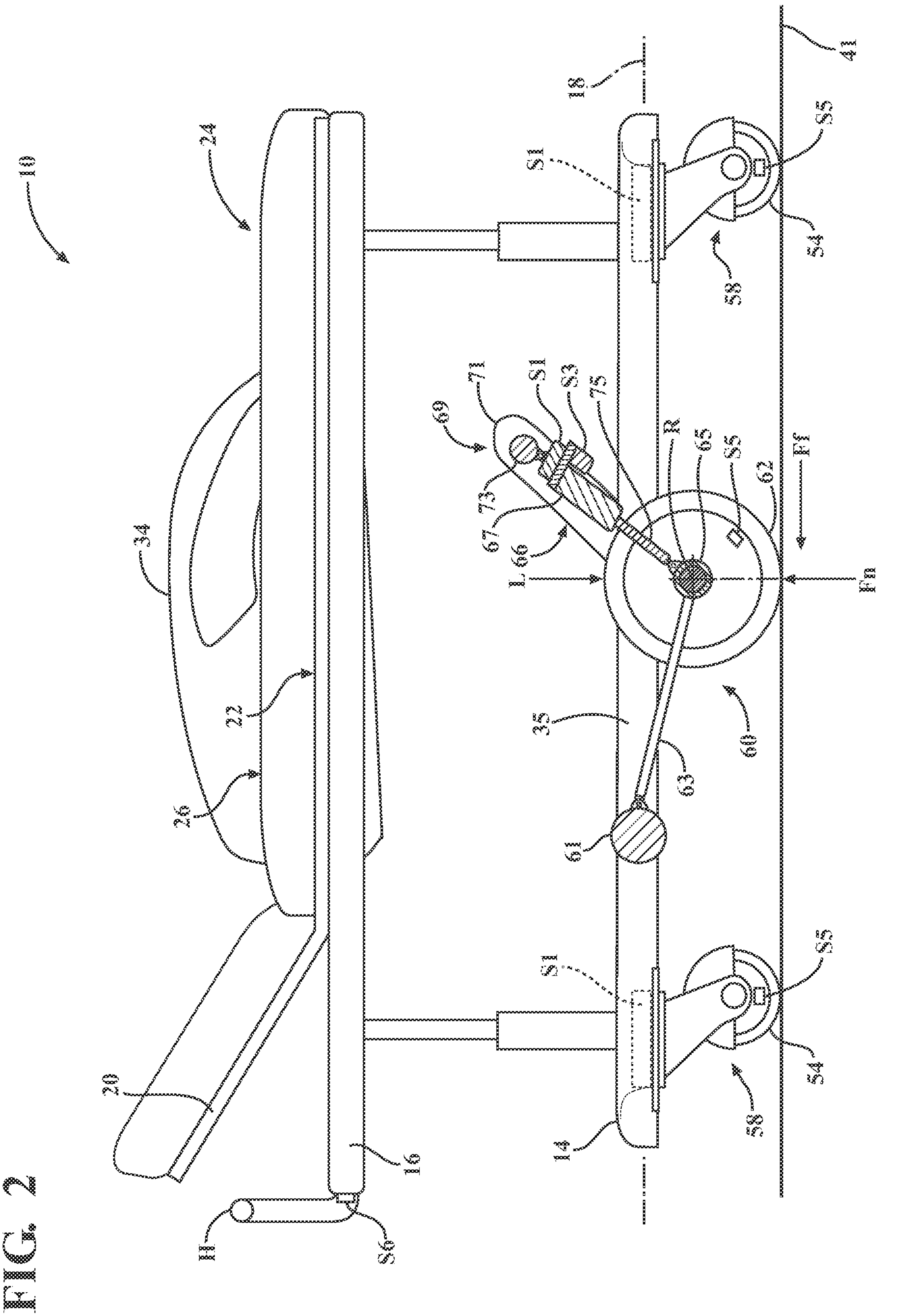
FIG. 2 is an elevational and partially cross-sectional view of the patient transport apparatus.

Referring to FIG. 2, in the embodiment shown, the auxiliary wheel assembly 60 comprises a pair of parallel and spaced deployment arms 63 pivotally connected to a first cross member 61. The first cross member 61 is fixed to the base 14. The first cross member 61 extends between two frame members 35 of the base 14. The deployment arms 63 extend from the first cross member 61 to an axle 65. The axle 65 rotatably supports the auxiliary wheels 62. In the embodiment shown, a central rotating shaft (not numbered) is fixed to the auxiliary wheels 62 to rotate inside the axle 65 about the rotational axis R. In other embodiments, the auxiliary wheels 62 are disposed about the axle 65 with bearings disposed between hubs of the auxiliary wheels 62 and the axle 65 so that the auxiliary wheels 62 are able to rotate about the rotational axis R relative to the axle 65. The deployment arms 63 are fixed to the axle 65 so that the axle 65 is able to pivot relative to the first cross member 61 in concert with the deployment arms 63.

The actuator 66 has a housing 67 pivotally coupled to the base 14. More specifically, an actuator support structure 69 extends across the base 14 to support the housing 67. The actuator support structure 69 comprises a pair of support arms 71 fixed to the frame members 35. The actuator support structure 69 further comprises a second cross member 73 fixed to and extending between the support arms 71. The housing 67 is pivotally connected to the second cross member 73. The actuator 66 further comprises a drive rod 75 that is driven by the actuator 66 to extend and retract with respect to the housing 67. Movement of the drive rod 75 relative to the housing 67 varies the deployment of the auxiliary wheels 62 by virtue of pivoting the axle 65 relative to the first cross member 61 to raise and lower the axle 65.

It should be appreciated that many other configurations of the patient transport apparatus 10 and the auxiliary wheel assembly 60 are possible for controlling deployment of the auxiliary wheels 62. In some cases, the actuator 66 may be rigidly fixed to the base 14 in a vertical arrangement to deploy the auxiliary wheels 62 vertically thereby eliminating the need for any pivot connections. In other cases, spring arrangements may be included between the auxiliary wheels 62 and the base 14 to provide some suspension to the auxiliary wheels 62. The arrangement described herein is merely exemplary of one possible arrangement of the auxiliary wheels 62 and their deployment.

As shown in FIG. 2, the actuator 66 is configured to control a load L carried by the auxiliary wheels 62 in the deployed positions. In particular, the further the actuator 66 extends the drive rod 75, the further the auxiliary wheels 62 are deployed thereby increasing a normal force Fn between the auxiliary wheels 62 and the floor surface 41. This consequently increases a frictional force Ff acting between the auxiliary wheels 62 and the floor surface 41. The normal force Fn is positively correlated with the load L carried by the auxiliary wheels 62. Thus, the larger the load L carried by the auxiliary wheels 62, the greater the normal force Fn, and consequently, the greater the frictional force Ff acting between the auxiliary wheels 62 and the floor surface 41. The magnitude of the frictional force Ff affects the ability of the auxiliary wheels 62 to avoid skidding when maneuvering around corners, or when traveling over uneven floor surfaces. The actuator 66 is controlled to control these forces, as described further below.

The actuators 66 may comprise an electric actuator, a hydraulic actuator, or a pneumatic actuator. The actuators 66 may comprise rotary actuators, linear actuators, or any other suitable actuators for moving the auxiliary wheels 62. In the embodiments shown herein, the actuators 66 are electrically-powered linear actuators. The actuators 66 may comprise reversible, DC motors, or other types of motors. The actuators 66 may be variable speed and capable of raising and/or lowering the auxiliary wheels 62 at different speeds. Suitable actuators include linear actuators supplied by LINAK A/S located at Smedevenget 8, Guderup, DK-6430, Nordborg, Denmark. It is contemplated that any suitable actuator capable of deploying the auxiliary wheel assembly 60 may be utilized in conjunction with the patient transport apparatus 10.

Figure 3:
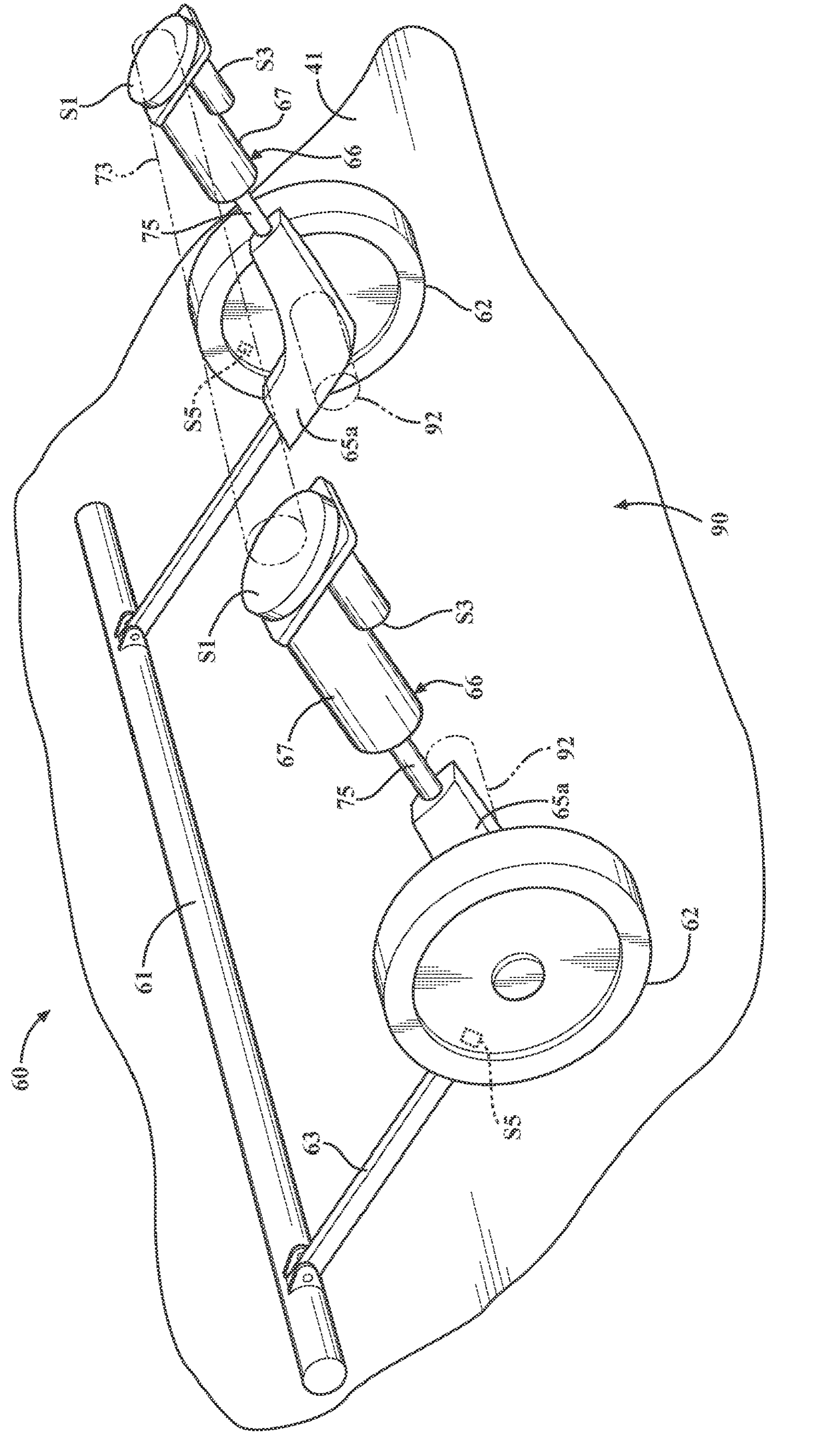
FIG. 3 is an illustration of an auxiliary wheel assembly according to one embodiment.

Referring to FIG. 3, in another embodiment, the auxiliary wheel assembly 60 comprises a pair of the actuators 66, one operably coupled to each of the auxiliary wheels 62. The actuators 66 are each operable to independently move the auxiliary wheels 62. Said differently, one actuator 66 moves one of the auxiliary wheels 62, and the other actuator 66 moves the other auxiliary wheel 62. In this embodiment, instead of the axle 65 rotatably supporting both of the auxiliary wheels 62, separate carriers **65*a* rotatably support each of the auxiliary wheels 62. The carriers 65*a*, like the axle 65, are fixed to one end of the deployment arms 63, which pivot relative to the first cross member 61. In this embodiment, the load L carried by each of the auxiliary wheels 62 can be independently controlled thereby independently controlling the forces between the auxiliary wheels 62 and the floor surface 41**.

Figure 4:
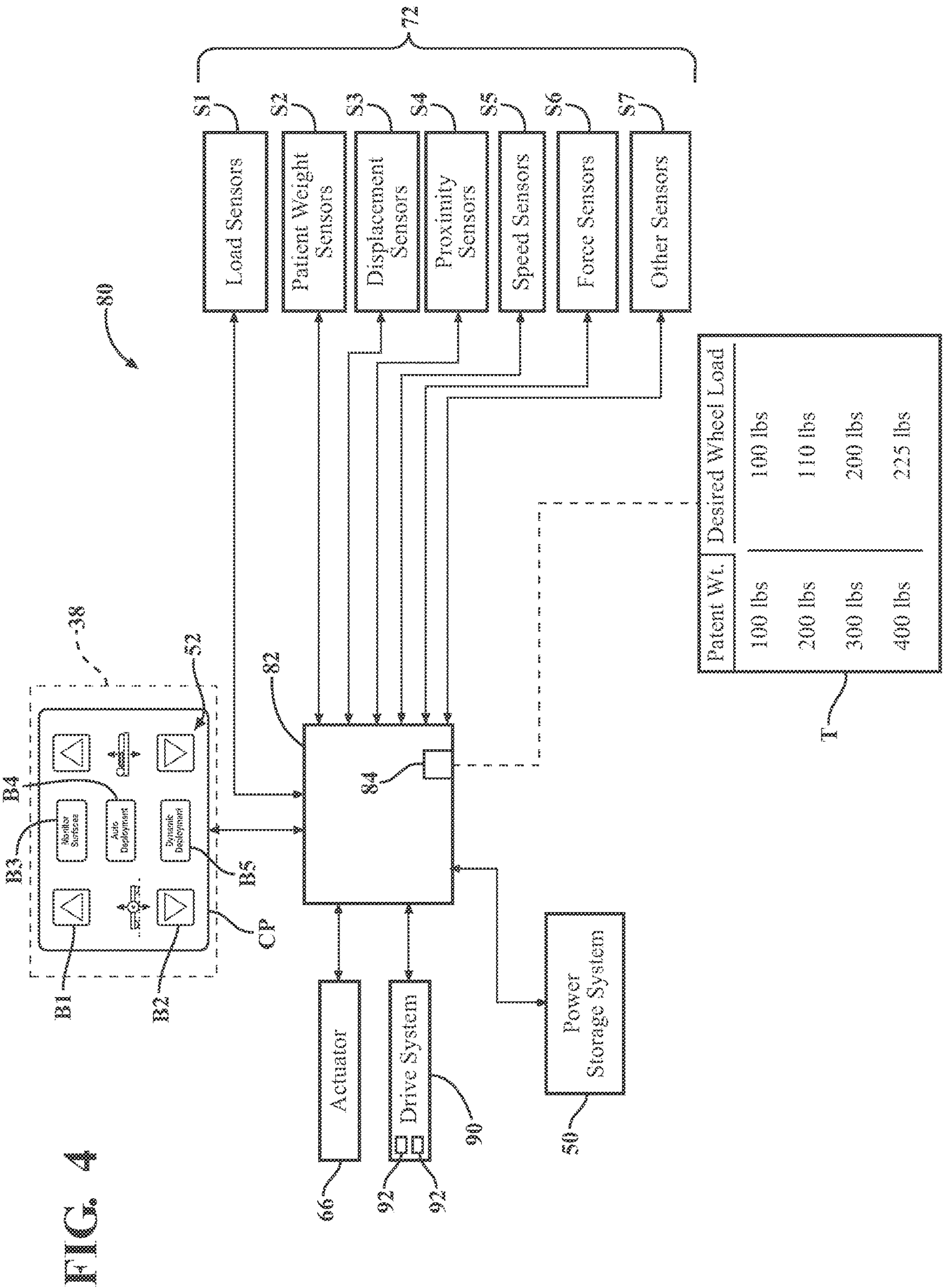
FIG. 4 is a schematic view of a controller and a sensing system.

Referring to FIG. 4, a control system 80 is provided to control operation of the actuators 66 and other powered devices that may be located on the patient transport apparatus 10. The control system 80 comprises a controller 82 having one or more microprocessors for processing instructions or for processing algorithms stored in memory 84 to control operation of the actuators 66 and other powered devices. Additionally or alternatively, the controller 82 may comprise one or more microcontrollers, field programmable gate arrays, systems on a chip, discrete circuitry, and/or other suitable hardware, software, or firmware that is capable of carrying out the functions described herein. The memory 84 may further store one or more look-up tables that define control parameters of the actuators 66 and other powered devices. The controller 82 may be carried on-board the patient transport apparatus 10, or may be remotely located. In one embodiment, the controller 82 is mounted to the base 14. The controller 82 may comprise one or more sub-controllers configured to control all actuators 66 and the other powered devices or one or more sub-controllers for each of the actuators 66 and the other powered devices. Power to the actuators 66 or other powered devices and/or the controller 82 may be provided by a power storage system 50, such as a battery system.

The controller 82 is coupled to the actuators 66 in a manner that allows the controller 82 to control the actuators 66. The controller 82 may communicate with the actuators 66 via wired or wireless connections. The controller 82 generates and transmits control signals to the actuators 66, or components thereof, to cause the actuators 66 to perform one of more desired movements or functions. The controller 82 may monitor an actual state of the actuators 66 and determine desired states to which the actuators 66 should be placed, based on one or more input signals that the controller 82 receives from one or more input devices. The state of the actuators 66 may be a position, a relative position, a speed, a force, a load, a current, an energization status (e.g., on/off), or any other parameter of the actuators 66. The input devices used to control operation of the actuators 66 comprises user input devices 52 and/or a sensing system 72 in communication with (e.g., coupled to) the controller 82.

In one embodiment, the user input devices 52 used to control operation of the actuators 66 comprise user input devices activated by caregivers or other users, which transmit corresponding input signals to the controller 82. The controller 82 controls operation of the actuators 66 based on the input signals. In one embodiment, the user input devices 52 are located on a control panel CP. The control panel CP is shown coupled to the footboard 38 (see also FIG. 1). It is to be appreciated that control panels CP could be coupled to one or more of the headboard 36, the footboard 38, the intermediate frame 16, the patient support deck 20, any combination of the side rails 28, 30, 32, 34, or any other suitable location.

The user input devices 52 are shown on the control panel CP in the form of push buttons that may be pressed to generate a variety of input signals, e.g., via a switch, etc. For instance, the push buttons shown comprise button B1 for raising the auxiliary wheels 62 to the stowed position and button B2 for deploying the auxiliary wheels 62 to the deployed positions. In some cases, a single press of button B1 raises the auxiliary wheels 62 to a home position, in which the auxiliary wheels 62 are stowed and out of contact with the floor surface 41. In some cases, a single press of button B2 deploys the auxiliary wheels 62 until the sensing system 72 detects contact with the floor surface 41 and then stops, and is thereafter automatically controlled according to the methods described herein. In other cases, deployment of the auxiliary wheels 62 to vary the load L carried by the auxiliary wheels 62 is performed manually with the user visually determining the appropriate amount of deployment by, for instance, deploying the auxiliary wheels 62 until one set of the support wheels 54 lift off the floor surface 41 and then backing off the deployment just enough to re-lower those support wheels 54 back to the floor surface 41. Accordingly, in this case, the auxiliary wheels 62 are handling the maximum load L possible without causing teeter-tottering of the patient transport apparatus 10 about the auxiliary wheels 62 (i.e., all of the support wheels 54 remain in contact with the floor surface 41).

Button B3 activates the sensing system 72 to monitor the floor surface 41 and button B4 enables automatic deployment of the auxiliary wheels 62 in certain situations such as when the controller 82 determines that the patient transport apparatus 10 is moving above a predetermined speed threshold. Button B5 activates a dynamic deployment function in which the extent of deployment of the auxiliary wheels 62 changes automatically in response to changing conditions. Other buttons for controlling other powered devices on the patient transport apparatus 10 may also be provided. It should be appreciated that the arrangement of buttons is merely exemplary and could be arranged differently or comprise different types of buttons for controlling other functionality. The user input devices 52 may assume forms other than the push buttons described, and may comprise touch screen buttons, sensors for receiving gesture commands, a microphone for receiving voice commands, etc. The user input devices 52 may also be located remotely, such as on remote pendants, portable electronic devices, or at nurses' stations.

The sensing system 72, in reference to the embodiment shown in FIG. 2, comprises a load sensor S1. The controller 82 is in communication with the load sensor S1 to acquire load measurements associated with a current load L on the auxiliary wheels 62. The load measurements may be based on associated input signals transmitted from the load sensor S1 to the controller 82. The load sensor S1 may be a load cell or other type of load sensor S1. The load sensor S1 may be coupled between the actuator 66 and the second cross member 73. In some embodiments, the load measurements comprise a current value of the load L shown in FIG. 2, or any current load value associated with the load L. Although the load sensor S1 shown in FIG. 2 is arranged at an angle to the direction of the load L, the load sensor S1 may be arranged at any suitable angle or direction relative to the load L. In embodiments in which the actuator 66 is vertically arranged, the load sensor S1 may directly output a force Fz that represents the current load value of the load L. In embodiments employing multiple actuators 66, such as shown in FIG. 3, separate load sensors S1 may be located between the actuators 66 and the second cross member 73 to acquire separate load measurements associated with the current loads applied to each auxiliary wheel 62.

Other configurations or arrangements of the load sensors S1 are also possible. For instance, one method of acquiring load measurements associated with the load L applied to the auxiliary wheels 62 is to place load sensors S1 in each of the support wheels 54 to measure the load carried by each of the support wheels 54 before deployment of the auxiliary wheels 62. The current load L carried by the auxiliary wheels 62 can then be determined by the decrease in the loads (e.g., off-loading) measured in each of the support wheels 54 when the auxiliary wheels 62 are deployed.

Once the loads carried by one or more of the support wheels 54 are decreased, a start-up force needed to push the patient transport apparatus 10 is reduced due to less frictional force being present between the support wheels 54 and the floor surface 41, as some or all of the support wheels 54 (which can be caster wheels) likely require being swiveled 90 degrees or more during start-up movement to reach a trailing orientation with respect to a desired direction of travel of the patient transport apparatus 10.

The sensing system 72 further comprises one or more patient weight sensors S2. The patient weight sensors S2 may comprise an array of load cells arranged between the patient support surface 22 and the support structure 12, such as between a weigh frame 78 and the intermediate frame 16. The load cells can be provided in several possible arrangements to determine a weight of the patient on the support surface 42. The controller 82 is in communication with the patient weight sensors S2 to measure the patient weight. The patient weight may be based on associated input signals transmitted from the patient weight sensors S2 to the controller 82. The desired load is based on the patient weight and can change with changes in patient weight. In one embodiment, the controller 82 uses the input signals from the patient weight sensors S2 to determine a target load value associated with the desired load that is to be carried by the auxiliary wheels 62. The target load value may be a discrete target value, part of a range of target values, or any other suitable target value. The controller 82 may determine the target load value associated with the desired load prior to deployment of the auxiliary wheels 62, e.g., with the auxiliary wheels 62 in the stowed position. The controller 82 may select the target load value without requiring any deployment of the auxiliary wheels 62 (e.g., independent of such deployment). In other words, the auxiliary wheels 62 do not need to be deployed to determine the target load value associated with the desired load. The controller 82 ultimately compares the load measurements acquired using the load sensor S1 (e.g., the current load values thereof) and the target load value to determine how to adjust the actuator 66 to achieve the target load value, as described further below.

Calibration of the patient transport apparatus 10 may be conducted to determine a correlation between the patient weight and the target load value associated with the desired load to be carried by the auxiliary wheels 62. For instance, the calibration may comprise placing several different weights on the patient transport apparatus 10 and determining a minimum value of the load L that can be carried by the auxiliary wheels 62 for each of the different weights to maintain suitable contact with the floor surface 41 during a cornering maneuver. Calibration may also comprise placing several different weights on the patient transport apparatus 10 and determining a maximum value of the load L that can be carried by the auxiliary wheels 62 before the patient transport apparatus 10 begins to teeter-totter on the auxiliary wheels 62. A percentage of the minimum value of the load L (e.g., 110%), a value between the minimum and maximum values, or any other suitable predetermined load value can then form the basis for the target load value associated with the desired load for each of the different weights thereby creating a correlation between the patient weight and the desired load.

Alternatively, instead of determining acceptable minimum and maximum values of the load L for each of the different weights, the controller 82 may determine acceptable minimum and maximum raw measurements from the load sensor S1 for each of the different weights. For example, owing to the arrangement of the actuator 66 in FIG. 2, the load sensor S1 is not vertically arranged to directly measure the load L. In this case, it may be unnecessary to resolve the measurement taken by the load sensor S1 into a value of the load L. Instead, a percentage of the minimum raw measurement (e.g., 110%), a value between the minimum and maximum raw measurements, or any other suitable predetermined value can then form the basis for the target load value associated with the desired load for each of the different weights thereby creating a correlation between the patient weight and the desired load.

Calibration may by conducted by the manufacturer of the patient transport apparatus 10 prior to use of the patient transport apparatus 10 to transport patients. In other words, the patient transport apparatus 10 may be pre-calibrated. As a result, in some cases, the controller 82 only needs to select/calculate the predetermined target load value in order to properly control the actuator 66 during use, without requiring a separate calibration for each patient. For instance, once the patient's weight (or total weight, etc.) is measured, the controller 82 merely selects/calculates the predetermined target load value based on the weight since the correlation between target load value and weight was developed during pre-calibration. Control of the actuator 66 commences based on this selection/calculation. Accordingly, a separate calibration routine for each patient is unnecessary in many cases. Furthermore, this selection/calculation of the predetermined target load value may be independent of any load measurements taken with the patient present on the patient transport apparatus 10. As mentioned above, the selection/calculation of the predetermined target load value for any particular patient can be made before, and/or independent of, deploying the auxiliary wheels 62 into contact with the floor surface 41.

The above-described calibration techniques are utilized to generate corresponding calibration data that may be stored in memory 84 for access by the controller 82. The calibration data can then be incorporated into a look-up table T stored in the memory 84 and accessible by the controller 82 to find the predetermined target load value associated with the desired load to be applied to the auxiliary wheels 62. The lookup table T comprises various patient weights and the predetermined target load values associated with the desired loads corresponding to the various patient weights. Alternatively, a correlation algorithm in which the patient weight is input to derive/calculate the predetermined target load value associated with the desired load can be developed and stored in the memory 84 to be accessed by the controller 82. Once the predetermined target load value associated with the desired load to be applied to the auxiliary wheels 62 is determined, the controller 82 operates the actuator 66 to deploy the auxiliary wheels 62 until the predetermined target load value associated with the desired load is reached, based on measurements taken with the load sensor S1.

The controller 82 may operate the actuator 66 to achieve the desired load either before or during transport of the patient. In some cases, the user may simply depress button B2 to deploy the auxiliary wheels 62, but without also actuating the button B5. Button B5 is associated with operating a continuous feedback loop that continuously (e.g., at a predetermined frequency) varies deployment of the actuator 66 during transport so that the desired load is maintained. Accordingly, when the button B5 is not enabled, the actuator 66 is initially deployed until the desired load is reached, but thereafter the actuator 66 is locked from any further movement until the user depresses button B1 to raise the auxiliary wheels 62.

Alternatively, the user may also depress the button B5, which instructs the controller 82 to continuously acquire load measurements associated with the current load using the load sensor S1 so that the actuator 66 can be continuously adjusted in the feedback loop to maintain the predetermined target load value associated with the desired load, e.g., enabling real-time, dynamic adjustment of the actuator 66 to maintain the desired load. This may be helpful for several reasons. For instance, the floor surface 41 may be uneven, and thus, the measurements acquired with the load sensor S1 may change in response to changes in the floor surface 41. By depressing the button B5 to enable the controller 82 to continuously adjust the actuator 66 in real-time, the controller 82 can dynamically account for such conditions. In other embodiments, the controller 82 may continuously adjust the actuator 66 automatically without requiring actuation of the button B5.

One benefit of controlling the actuator 66 in the manner described above is that the auxiliary wheel assembly 60 is not necessarily sensitive to manufacturing tolerances in terms of the extent of deployment of the auxiliary wheels 62, as the extent of deployment adjusts based on load. In other words, the actuator 66 can reliably and quickly be controlled to provide the desired load regardless of manufacturing variations between different auxiliary wheels assemblies 60 of different patient transport apparatuses 10. In cases where the actuators 66 are controlled to move the same distance for all patient transport apparatuses 10 to deploy the auxiliary wheels 62, variability in the manufacturing of the auxiliary wheel assemblies 60 can affect the resulting load applied on the auxiliary wheels 62 and subsequent performance of the patient transport apparatus 10.

Other methods of sensing the load carried by the auxiliary wheels 62 can be employed. For instance, the sensing system 72 may instead (or additionally) comprise a displacement sensor S3, such as an encoder integrated into the actuator 66. For example, the controller 82 may be in communication with the displacement sensor S3 to measure changes in displacement of the actuator 66, such as changes in length of the drive rod 75 extending from the housing 67, changes in an overall length of the actuator 66, changes in position of a motor of the actuator 66 (e.g., a stepper motor), and the like. In general, these displacement measurements are also associated with the current load being carried by the auxiliary wheels 62. For instance, the greater the drive rod 75 is extended from the housing 67, the greater the load being applied to the auxiliary wheels 62. Similar to the calibration previously described, additional calibration can be conducted to correlate displacement to the desired load (assuming flat floor surface 41) based on various patient weights so that another look-up table correlating the patient weight to predetermined target displacement values can be created and stored in the memory 84. When using the displacement sensors S3, in one instance, the controller 82 will operate the actuator 66 to extend/retract the actuator 66 according to a predetermined target displacement value associated with the desired load and displace the auxiliary wheels 62 accordingly.

Figure 4A:
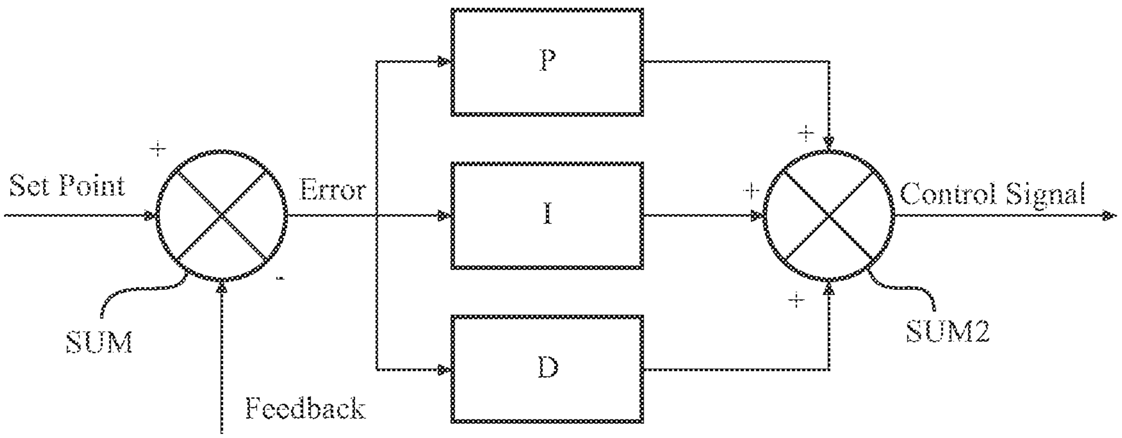
FIG. 4A is a schematic view of a control loop.

In one embodiment, as shown in FIG. 4A, the controller 82 employs a closed-loop feedback technique to iteratively adjust the current load to the desired load. Specifically, the controller 82, using the load sensor S1 (or other sensor), is configured to acquire the feedback measurements associated with the current load. The controller 82 determines and stores the predetermined target value associated with the desired load in memory 84 and utilizes an algorithm, logic or hardware to compare the feedback measurements (e.g., values thereof) and the predetermined target value (i.e., set point) to determine a difference or error value therebetween. Based on the determined error value, the controller 82 recognizes that the current load should be adjusted to be closer to the desired load. In turn, the controller 82 generates the control signal for controlling the actuator 66. When the control signal is applied to the actuator 66, movement of the actuator 66 is adjusted to change the current load relative to the desired load. More specifically, the actuator 66 is adjusted to minimize the difference or error between the acquired measurements associated with the current load and the predetermined target value associated with the desired load. The feedback loop may continue until the acquired measurements reach the predetermined target value, i.e., the current load reaches the desired load.

The control loop employed by the controller 82 may be a proportional (P), proportional-integral (PI), proportional-derivative (PD), or proportional-integral-derivative (PID) control loop. The (P), (I) and (D) terms are computation blocks comprising tuning parameters, which are implemented by the controller 82. The error value is inputted to any of the (P), (I), and (D) blocks, which, if present, apply their respective tuning parameter to the error value. For example, the (P) tuning parameter corrects present (current) error by producing an output value that is proportional to the present error, the (I) tuning parameter corrects past error by producing an output value that is proportional to the magnitude and duration of the error over time, and the (D) tuning parameter predicts behavior of the actuator 66 or the auxiliary wheel assembly 60 by producing an output value that takes into account a slope of the error over time. It is to be appreciated that the controller 82 may implement other types of feedback control, such as any suitable linear feedback or fuzzy logic based feedback.

In one specific implementation of the above-described technique, the sensing system 72 comprises electrical current sensors S7 in communication with the controller 82 to measure electrical current applied to or utilized by the actuator 66 (e.g., of an electric motor of the actuator 66) when the auxiliary wheels 62 are deployed relative to the floor surface 41. The electrical current used by the actuator 66 is associated with a current load applied to the auxiliary wheels 62. The controller 82 compares the electrical current measurements to a predetermined target electrical current value associated with the desired load and generates a pulse width modulated (PWM) control signal providing a specific voltage to the actuator 66 to effect the appropriate displacement thereto for adjusting (or minimizing error between) the electrical current measurements relative to the predetermined target electrical current value, i.e., to adjust the current load relative to the desired load.

The controller 82 may utilize any measurements made using the sensing system 72 that are associated with the current load and may utilize any predetermined target values associated with the desired load. As set forth above, measurements such as load measurements, displacement measurements, electrical current measurements, and the like are associated with the current load L applied to the auxiliary wheels 62. Additionally, as set forth above, predetermined target values of load, displacement, electrical current, and the like are associated with the desired load. In other embodiments, measurements of other forces, such as the normal force Fn, the frictional force Ff, etc., may also be taken. These other forces are similarly associated with the current load. Likewise, the predetermined target values may be predetermined target values of such forces.

Figure 5:
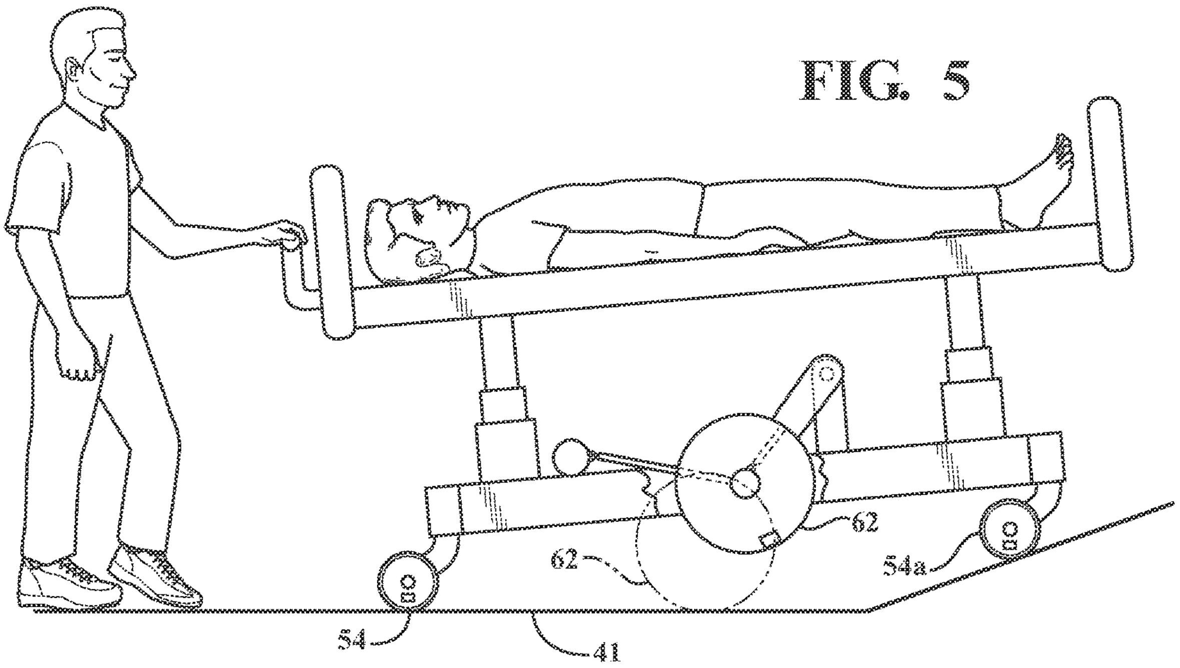
FIG. 5 is an illustration of the patient transport apparatus being moved up a ramp.

When the loads applied to the auxiliary wheels 62 are continuously monitored by taking regular measurements with the load sensor S1 (or other sensor), and the actuator 66 is continuously adjusted to meet the desired load (via comparison to the predetermined target value and associated adjustment), the controller 82 is able to maintain the necessary amount of frictional force Ff sufficient for mechanical grip when steering and, in some cases, for ascending or descending ramps. For instance, referring to FIG. 5, when ramps are first engaged by a leading pair of support wheels 54*a*, the auxiliary wheels 62 will tend to be lifted off the floor surface 41. However, with dynamic deployment enabled via the button B5, the load sensor S1 (or other sensor) will immediately notice the removal of load from the auxiliary wheels 62 and the controller 82 will react by operating the actuator 66 until the auxiliary wheels 62 are deployed far enough to achieve the desired load. This helps to maintain control of the patient transport apparatus 10 even over such ramps.

In other embodiments, instead of controlling the actuator 66 so that the load L is held constant at a desired level, it may be desirable to control the actuator 66 to vary the load L carried by the auxiliary wheels 62 during transport. This may be helpful when the predetermined target value associated with the desired load is being constantly recalculated to account for other variables, such as location of the patient on the patient transport apparatus 10. For instance, as the patient shifts on the patient transport apparatus 10, a center of gravity of the patient may also shift, which may change the predetermined target value associated with the desired load. The center of gravity of the patient can be determined by the controller 82 in response to signals from the patient weight sensors S2 so that the controller 82 can detect shifts in the center of gravity and recalculate the predetermined target value associated with the desired load when appropriate. Other reasons for changing the load carried by the auxiliary wheels 62 are also contemplated.

In some embodiments, the sensing system 72 comprises one or more proximity sensor S4 in communication with the controller 82 to detect obstacles on/in the floor surface 41 or unevenness of the floor surface 41. This functionality can be enabled automatically or upon actuation of the button B3 on the control panel CP. When enabled, the proximity sensors S4 generate input signals that are transmitted to the controller 82 so that the controller 82 can sense or detect obstacles or unevenness of the floor surface 41 ahead of the patient transport apparatus 10 during transport. If an obstacle is sensed, the controller 82 operates the actuator 66 to raise and/or lower the auxiliary wheels 62 to avoid the obstacle. The auxiliary wheels 62 may be lowered such that one or more of the support wheels 54 are lifted off of the floor surface 41 and suspended to pass over the obstacle. Additionally, when the support wheels 54 lift off of the floor surface 41 the patient transport apparatus 10 may be able to climb obstacles. Lifting one or more of the support wheels 54 to climb an obstacle can also eliminate a collision with the obstacle which may send an undesirable shock through the patient transport apparatus 10.

If the proximity sensor S4 detects unevenness in the floor surface 41, the controller 82 can be programmed to predict required changes in displacement of the actuator 66 that are likely needed to account for such changes before the auxiliary wheels 62 reach the areas of unevenness in the floor surface 41. Accordingly, the adaptiveness of the actuator 66 in response to unevenness in the floor surface 41 can be improved and made to be proactive and predictive in nature rather than merely being reactive to changes in measurements taken with the load sensor S1. Accordingly, the controller 82 can better maintain the desired load.

In further embodiments, the controller 82 learns transport paths taken by the patient transport apparatus 10 by storing path data in the memory 84 associated with the transport paths. This path data may comprise, for instance, distances to the floor surface 41 that are continuously measured by the proximity sensor S4 during transport. In some cases, this path data is collected any time the patient transport apparatus 10 is moving, e.g., data collection can be triggered by a motion detector (not shown) that cooperates with the controller 82 to instruct the controller 82 to begin readings with the proximity sensor S4. In these embodiments, the controller 82 can be programmed, when traveling along any transport path, to evaluate the current distances being measured and compare them to the stored path data to see if any matching patterns emerge. This could be accomplished with a pattern matching algorithm. If a match is found, the controller 82 retrieves the associated stored path data and automatically controls the actuator 66 based on the stored path data. By controlling the actuator 66 based on the stored path data, the controller 82 automatically accounts for any unevenness, ramps, thresholds, and the like, that may be encountered along the current path.

In still further embodiments, path data is mapped for each facility in which the patient transport apparatus 10 is to be used. More specifically, location data is associated with the path data so that, when the patient transport apparatus 10 is at a particular location in the facility, the controller 82 can retrieve the stored path data for that location and control the actuator 66 based on the stored path data. The location data can be GPS data or any other location data. In these embodiments, a locator (not shown) would be placed on the patient transport apparatus 10 to determine the current position of the patient transport apparatus 10. The locator could be a GPS locator in communication with the controller 82.

The sensing system 72 may further comprise speed sensors S5 coupled to either or both of the auxiliary wheels 62. Additionally, the sensing system 72 may further comprise speed sensors S5 coupled to one or more of the support wheels 54. The controller 82 interprets input signals generated by the speed sensors S5 to compute rotational speeds of the auxiliary wheels 62 and the support wheels 54. The speed sensors S5 may comprise wheel speed sensors, such as magnetic speed sensors, or any other sensors capable of measuring rotational speeds of the auxiliary wheels 62 and the support wheels 54.

In one embodiment, the controller 82 is configured to compare the rotational speeds of the auxiliary wheels 62 to the rotational speeds of the support wheels 54 to determine if the auxiliary wheels 62 are slipping on the floor surface 41. For instance, if the auxiliary wheels 62 are of the same diameter as the support wheels 54, then the auxiliary wheels 62 should have the same rotational speed as the support wheels 54, assuming all wheels 54, 62 are moving longitudinally. However, if the controller 82 determines that one or more of the auxiliary wheels 62 are rotating at a slower rotational speed than all the support wheels 54, this may be an indication of wheel slippage and the controller 82 may operate the actuator 66 until the rotational speeds are equal. This comparison can also be adjusted to account for different diameters of the wheels 54, 62.

In some cases, in order to analyze the rotational speeds of the wheels 54, 62 to detect wheel slippage, the controller 82 may need to know if the wheels 54, 62 are all traveling longitudinally, e.g., straight down a hallway, or around a corner. This can be determined based on a separate analysis of the rotational speeds of the support wheels 54 located on opposing sides of the patient transport apparatus 10, i.e., if the support wheels 54, which are of the same diameter, have different rotational speeds, this may be an indication that the patient transport apparatus 10 is moving around a corner (e.g., outer support wheels 54 are traveling a greater distance around the corner in the same amount of time). The controller 82 can still evaluate the rotational speeds of the auxiliary wheels 62 to monitor for wheel slippage by comparing their rotational speeds to expected rotational speeds. The controller 82 can compensate for such slippage by dynamically operating the actuator 66 to further deploy the auxiliary wheels 62 and increase the load L as needed, e.g., until the rotational speeds of the auxiliary wheels 62 are within acceptable deviation from expected rotational speeds associated with good contact on the floor surface 41.

The sensing system 72 may further comprise other sensors S7 coupled to the patient transport apparatus 10 to detect a motion condition of the patient transport apparatus 10. Other parameters and/or conditions of the patient transport apparatus 10 may also be detected by the other sensors S7. In some cases, such as when button B4 is activated to enable automatic deployment of the auxiliary wheels 62, the controller 82 determines if the patient transport apparatus 10 exhibits one or more of the following motion conditions: (1) the patient transport apparatus 10 is moving (e.g., not stationary); (2) the patient transport apparatus 10 is moving at or above a predetermined speed threshold (e.g., at or above 0.5 mph, at or above 1.0 mph, at or above 2.0 mph, and the like; (3) the patient transport apparatus 10 is moving in a predetermined direction (e.g., longitudinally); (4) the patient transport apparatus 10 is moving for at least a predetermined amount of time (e.g., for at least 1.0 second, for at least 5.0 seconds, for at least 10.0 seconds, etc.); (5) the patient transport apparatus 10 is accelerating; and (6) the patient transport apparatus 10 is accelerating in a predetermined direction (e.g., longitudinally).

With button B4 activated, the controller 82 is configured to control operation of the actuator 66 to initiate deployment of the auxiliary wheels 62 from their stowed position to the floor surface 41 based on the one or more motion conditions of the patient transport apparatus 10. For example, motion detected in the longitudinal direction for at least 5.0 seconds and above 1.0 mph may indicate that the patient transport apparatus 10 is moving down a long hallway. In this case, the controller 82 automatically deploys the auxiliary wheels 62 to assist with such movement. Other combinations of motion conditions (or a single motion condition) may also trigger automatic deployment of the auxiliary wheels 62. In some embodiments, the controller 82 may be programmed for such automatic deployment independent of the activation of button B4 and button B4 may be absent in other embodiments employing such automatic deployment. The other sensors S7 may comprise one or more accelerometers, gyroscope sensors, motion sensors, speed sensors, optical sensors, combinations thereof, and the like. The other sensors S7 may be mounted to any portion of the patient transport apparatus 10, e.g., the base 14, intermediate frame 16, patient support deck 20, side rails 28, 30, 32, 34, headboard 36, footboard 38, support wheels 54, auxiliary wheel assembly 60, and the like.

Figure 6:
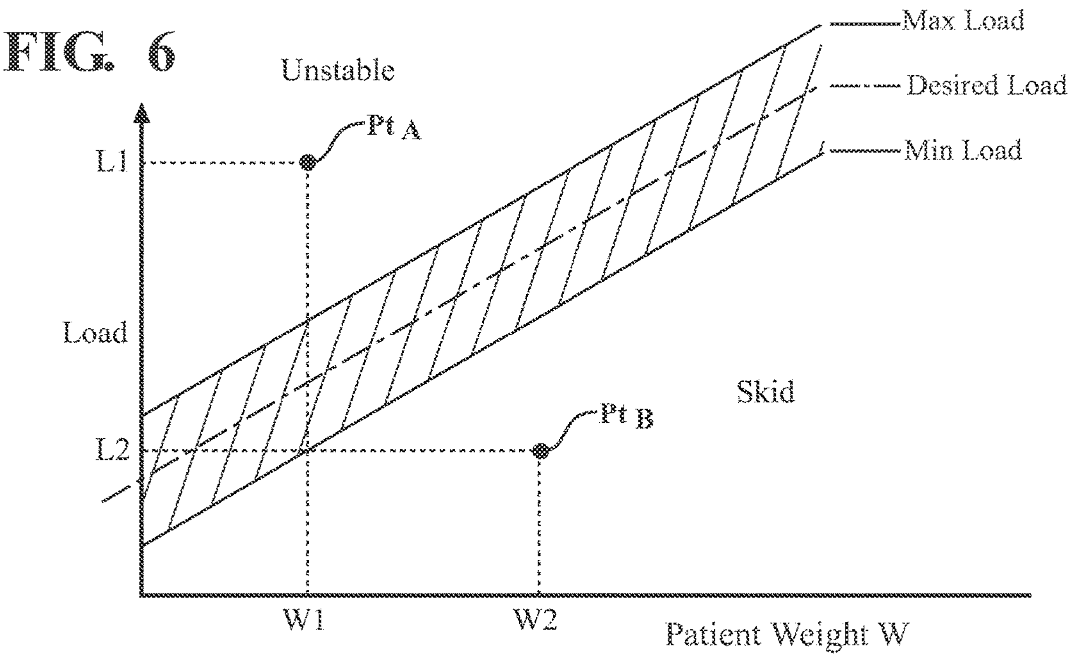
FIG. 6 is a graph showing operating conditions of the patient transport apparatus.

FIG. 6 is a graph that illustrates the desired load to be applied to the auxiliary wheels 62 as a function of the patient weight W. Also represented is an acceptable band of deviation from the desired load, illustrated between minimum and maximum loads. Although the line representing the desired load is shown as being linear, this relationship may be non-linear, or dictated by the testing previously described. Also shown in the graph are zones labeled "Unstable" and "Skid." For example, referring to point A in the graph, the load L1 applied to the auxiliary wheels 62 is too large for the patient weight W1. As a result, the patient transport apparatus 10 may become unstable on the floor surface 41 by being deployed too far such that two of the support wheels 54 become lifted off the floor surface 41 resulting in a teeter-tottering effect of the patient transport apparatus 10 about the auxiliary wheels 62. Conversely, referring to point B in the graph, the load L2 applied to the auxiliary wheels 62 is too small for the patient weight W2. As a result, the patient transport apparatus 10 may skid on the floor surface 41 when traveling around a corner owing to the frictional force Ff between the auxiliary wheels 62 and the floor surface 41 being too small. In order to prevent the patient transport apparatus 10 from being unstable or the auxiliary wheels 62 from skidding during cornering, the controller 82 adjusts the actuator 66 so that the measured load falls within the band between the maximum load and the minimum load.

In an additional embodiment of the patient transport apparatus 10, the auxiliary wheel assembly 60 may further comprise a drive system (see, e.g., FIGS. 3 and 4). The drive system 90 is operably coupled to the auxiliary wheels 62 to rotate the auxiliary wheels 62 and propel the patient transport apparatus 10. The drive system 90 assists the caregiver by reducing a force required to move the patient transport apparatus 10. The drive system 90 may comprise one or more electric motors 92. In embodiments in which separate actuators 66 are used to independently deploy the auxiliary wheels 62, the motors 92 are separately coupled to the auxiliary wheels 62. The motors may be arranged to directly drive the auxiliary wheels 62 (FIG. 3) or may be connected to the auxiliary wheels 62 via a gearbox. The drive system 90 may receive control signals from the controller 82 in response to user input devices 52 activated by the caregiver.

The user input devices 52 that activate the drive system 90 may comprise a switch on the patient transport apparatus 10 or a button on the control panel CP. The user input devices 52 may also comprise one or more control handles H (see FIG. 2) having force sensors S6, such as load cells, able to detect forces applied by the caregiver on the handles H. The controller 82, based on input signals from the force sensors S6 can determine a direction and/or magnitude of the force being applied and thus a direction and/or speed of desired movement. The controller 82 can then control the drive system 90 to move the patient transport apparatus 10 in the desired direction. Other arrangements of the drive system 90 or methods of controlling the drive system 90 are also contemplated.

Figure 7:
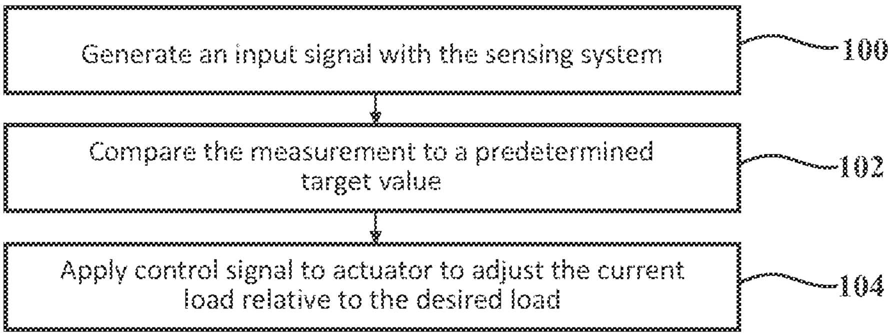
FIG. 7 is a flow chart of a method for controlling the patient transport apparatus.

An exemplary method of controlling the patient transport apparatus 10 to transport the patient over the floor surface 41 is shown in FIG. 7. The method comprises step 100 of acquiring a measurement. In one embodiment, the load sensor S1 is used to acquire the measurement. In other embodiments, the position sensor, current sensor, or other sensor is used to acquire the measurement. The measurement is associated with the current load being carried by the auxiliary wheels 62. In step 102, the controller 82 compares the acquired measurement to a predetermined value, e.g., a predetermined value of load, position, current, etc. In step 104, the controller 82 applies a control signal to the actuator 66 to adjust the current load relative to the desired load so that the force acting between the auxiliary wheels 62 and the surface 41 is adjusted. In one embodiment, the controller 82 adjusts the actuator 66 until a desired load is reached, the desired load being associated with a desired force acting between the auxiliary wheels 62 and the surface 41.

It is to be appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient transport apparatus for transporting a patient over a surface, the patient transport apparatus comprising:

a base;

support wheels coupled to the base and swivelable about swivel axes;

an auxiliary wheel assembly coupled to the base and comprising first and second auxiliary wheels configured to move between a plurality of wheel positions, the auxiliary wheel assembly further comprising an actuator operably coupled to the first and second auxiliary wheels to move the first and second auxiliary wheels between the plurality of wheel positions;

a sensing system comprising a sensor to detect a motion condition of the patient transport apparatus; and a controller coupled to the sensing system and to the actuator, the controller being configured to drive the actuator to move the first and second auxiliary wheels between the plurality of wheel positions based on the motion condition of the patient transport apparatus.

2. The patient transport apparatus of claim 1, wherein the sensing system includes a rotational speed sensor coupled to one of the support wheels, and a rotational speed sensor coupled to one of the first and second auxiliary wheels; and wherein the controller is configured to determine motion of the patient transport apparatus around a corner based on the rotational speed sensors.

3. The patient transport apparatus of claim 1, wherein the sensing system includes an accelerometer.

4. The patient transport apparatus of claim 3, wherein the accelerometer is operatively attached to the base.

5. The patient transport apparatus of claim 1, wherein the sensing system includes a rotational speed sensor coupled to one of the support wheels.

6. The patient transport apparatus of claim 1, wherein the sensing system includes a rotational speed sensor coupled to one of the first and second auxiliary wheels.

7. The patient transport apparatus of claim 1, wherein the motion condition comprises longitudinal movement of the patient transport apparatus.

8. The patient transport apparatus of claim 1, wherein the motion condition comprises changes in velocity of the patient transport apparatus.

9. The patient transport apparatus of claim 1, wherein the motion condition comprises movement of the patient transport apparatus around a corner.

10. The patient transport apparatus of claim 1, wherein the first and second auxiliary wheels are non-swivelable relative to the base.

11. The patient transport apparatus of claim 10, wherein the first and second auxiliary wheels are non-powered.

12. The patient transport apparatus of claim 1, wherein the sensing system comprises a proximity sensor to detect obstacles and the controller is configured to operate the actuator to raise and lower the first and second auxiliary wheels in response to the obstacles detected by the proximity sensor.

13. The patient transport apparatus of claim 1, wherein the controller is configured to drive the actuator such that all of the support wheels remain in contact with the surface.

14. The patient transport apparatus of claim 1, wherein the controller is configured to drive the actuator during transport to dynamically adjust the actuator during transport.

15. The patient transport apparatus of claim 1, wherein the support wheels each define a respective support wheel diameter; and wherein the first and second auxiliary wheels each define a respective auxiliary wheel diameter larger than the support wheel diameters.

16. A patient transport apparatus for transporting a patient over a surface, the patient transport apparatus comprising:

a base;

support wheels coupled to the base and swivelable about swivel axes;

an auxiliary wheel assembly coupled to the base and comprising first and second auxiliary wheels configured to move between a plurality of wheel positions, the auxiliary wheel assembly further comprising first and second actuators operably coupled to the first and second auxiliary wheels to move the first and second auxiliary wheels between the plurality of wheel positions;

a sensing system comprising a sensor to detect a motion condition of the patient transport apparatus; and a controller coupled to the sensing system and to the first and second actuators, the controller being configured to drive the first and second actuators to move the first and second auxiliary wheels between the plurality of wheel positions based on the motion condition of the patient transport apparatus.

17. The patient transport apparatus of claim 16, wherein the controller is configured to independently operate the first and second actuators.

18. The patient transport apparatus of claim 16, wherein the sensing system includes a rotational speed sensor coupled to one of the support wheels, and a rotational speed sensor coupled to one of the first and second auxiliary wheels; and wherein the controller is configured to determine motion of the patient transport apparatus around a corner based on the rotational speed sensors.

19. The patient transport apparatus of claim 16, wherein the motion condition comprises one or more of: motion of the patient transport apparatus; direction of motion of the patient transport apparatus; duration of motion of the patient transport apparatus; and changes in velocity of the patient transport apparatus.

20. The patient transport apparatus of claim 16, wherein the controller is configured to drive the first and second actuators such that all of the support wheels remain in contact with the surface.

* * * * *